Feb. 12, 1924.
J. T. LITTLETON, JR
1,483,461
HEAT TREATMENT OF GLASS ARTICLES
Filed July 19, 1921
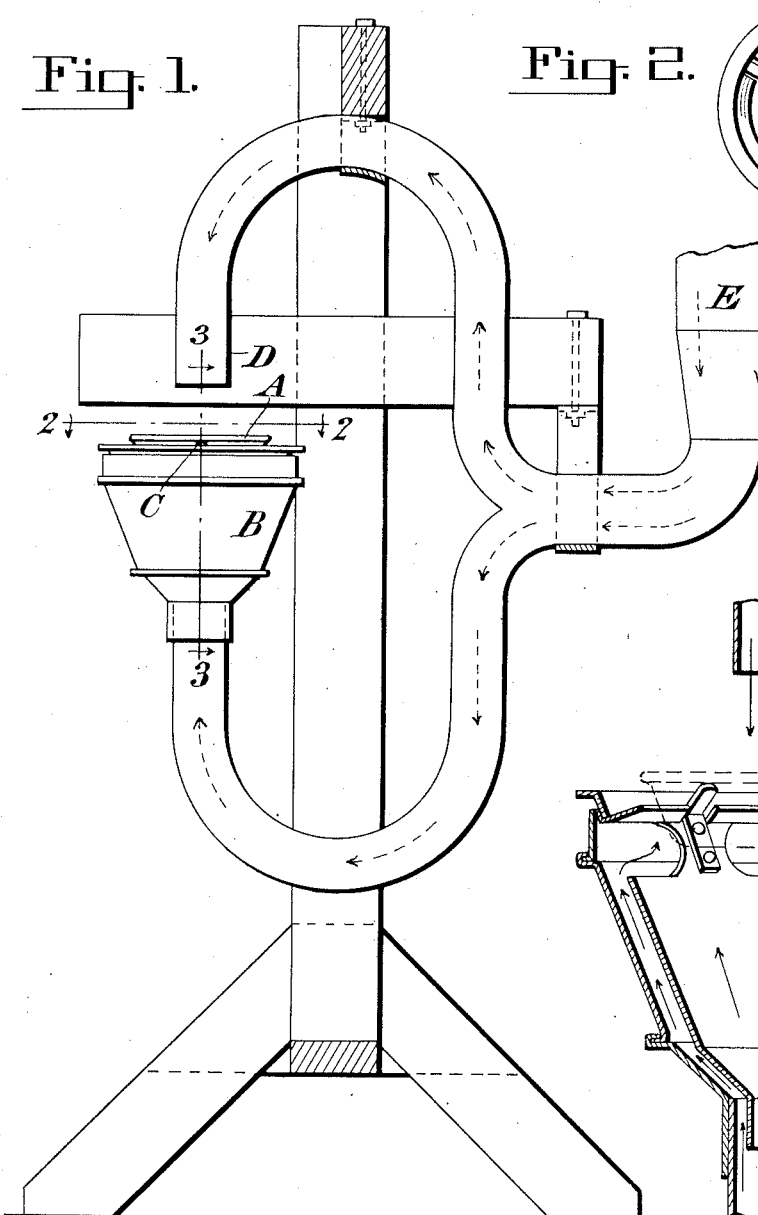
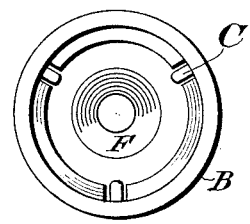
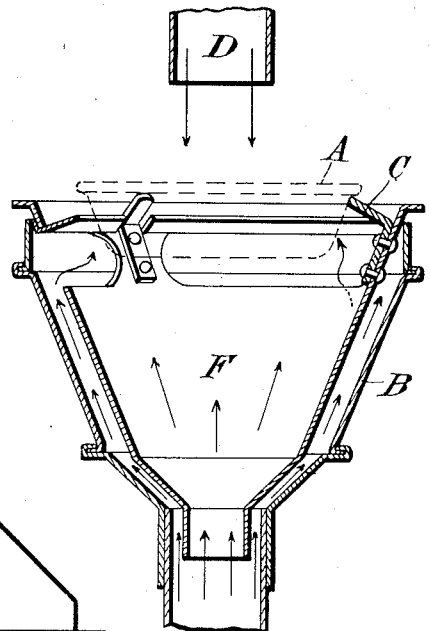
Jesse T. Littleton, Jr.
INVENTOR
BY
ATTORNEY Patented Feb. 12, 1924.

1,483,461

UNITED STATES PATENT OFFICE.

JESSE T. LITTLETON, JR., OF CORNING, NEW YORK, ASSIGNOR TO CORNING GLASS WORKS, OF CORNING, NEW YORK, A CORPORATION OF NEW YORK.

HEAT TREATMENT OF GLASS ARTICLES.

Application filed July 19, 1921. Serial No. 485,865.

*To all whom it may concern:*

Be it known that I, JESSE T. LITTLETON, Jr., a citizen of the United States of America, and a resident of Corning, New York, have invented certain new and useful Improvements in Heat Treatment of Glass Articles, of which the following is a specification.

This invention relates to a process or an apparatus for treating articles, especially those of a general concavo-convex form, after their fabrication from plastic glass (either by pressing or blowing) whereby their endurance will be increased, and for the purpose of illustration will be described in connection with the treatment of articles such as dishes of various kinds, consisting of a bottom surrounded by upstanding side walls, all of considerable thickness, (say of from ¼ to ⅜ of an inch). So far as known such articles were, prior to this invention, annealed, i. e. subjected to a treatment having for its object the removal of the unequal stress set up in the articles by the process used in their fabrication. While, according to one form of this invention, the random strains attendant on fabrication are removed, in all forms of this invention other and determined strains are introduced into the article, such strains being in location, direction and character such as to tend to counteract the strains which would otherwise cause breaking thereof in use. The most common cause of such breaking is sudden cooling of the article, which tends to place the surface of the article at the cool portion under tension.

This invention will be claimed at the end hereof, but will be first described in connection with the accompanying drawings, in which—

Figure 1, shows in side elevation, partly in section, an apparatus forming part of this invention;

Fig. 2, is a plan view of the lower nozzle, as seen from the line 2—2 of Fig. 1; and Fig. 3, is a vertical longitudinal section taken approximately on the line 3—3 of Fig. 1.

Referring to the accompanying drawings which show apparatus forming part of this invention, and which may be used for carrying out the process here claimed, and taking as a specific example the application of the invention to the heat treatment of a pressed dish of the shape above referred to, the article while heated, and well above the annealing temperature of the glass of which it is composed, is subjected to rapid and sudden chilling in a blast of air or any fluid vapor or spray of such a character, and so directed, that rapid and sudden chilling results, both on the inner and outer surfaces of the article.

This can be done by placing a hot article A into a nozzle B having a suitable holder C formed therein so that the article will be positioned between the nozzle B and another nozzle D. The nozzles B and D are directed toward each other and connected to a suitable air line E from a source of air pressure. The nozzles should be of such a shape and character as to direct the air against the surface of the glass to produce the desired effect thereon. In the apparatus shown this is accomplished by placing a perforated distributing cone F inside the lower nozzle B to distribute the air in the desired manner.

The result obtained is a greater cooling of the surfaces of the glass than the intermediate layer thereof, whereby the surface layers are placed under compression by the subsequent cooling of the intermediate layer. If an article so treated is subsequently heated to below its annealing temperature and then cooled, the initial effect of the cooling (which, if the article was annealed, would be to put tensile strength on the surface layers) is merely to reduce the compression strains in such surface layers, which however return to approximately their original values on the uniform cooling of the article.

Thus, the setting up in use, of tensile strains from cooling is prevented.

The compressive strains so introduced are not detrimental because glass has a resistance to such strains much in excess of those to which it is generally subjected in use and indeed the compressive strains in themselves tend to greater mechanical endurance in that glass broken mechanically, generally breaks by bending, which causes tensile strains in a surface layer.

If uniform compressive strains are to be given to all portions of the surface layers of the article, it is desirable in carrying out this invention, that all portions of the article have uniform temperature when submitted to the air blast, and that the air blast be directed against all portions of the surfaces in such a manner as to cause uniform temperature reductions therein.

The first condition seldom occurs in articles as they leave the pressing mold, as the contact is generally longer maintained between the outside of the article and the mold, than between the inside of the article and the plunger. Hence, to obtain it, the article, after being taken from the mold, should be reheated either by properly directed burners, or by being placed in a furnace.

The second condition, i. e., uniform cooling, may be obtained by properly directing the air blast, the rate of cooling being proportionately to the velocity with which the air strikes the surface and the angle of impact of the air on the surface. Or, if the article is not uniformly heated when subjected to the air treatment, the cooling rate may be locally varied by properly forming the nozzles to deliver air locally on the article in accordance with the desired rate of cooling.

In certain cases it may be desired, however, to locally vary the compressive strains at different portions of the surface. This can be accomplished by locally varying the temperature in the article at the commencement of treatment, or by locally varying the cooling rate, as described.

In all cases, it is desirable however, that the cooling rate be relatively rapid and that high velocity jets directed substantially on the surface be employed for this purpose. It is also important that both the outer and inner surfaces of the articles be chilled as marked reduction of resistance occurs when only a single surface is so chilled.

Having thus described this invention what is claimed is:—

1. The herein above described method of heat treatment of glass articles to increase their thermal and mechanical endurance which consists in rapidly cooling the article while heated to a point above the annealing temperature of the glass of which it is composed by high velocity air jets directed on substantially the entire surface of the article substantially normal to the surface thereof.

2. The hereinbefore described method of heat treatment of pressed glass articles to increase their thermal and mechanical endurance which consists in heating the article after pressing to equalize the temperature of different parts thereof, and in then rapidly uniformly cooling the article from a substantially uniform temperature above the annealing temperature of the glass of which it is composed by high velocity air jets directed on substantially the entire surface of the article.

In testimony whereof, I hereunto sign my name at Corning, New York, U. S. A., this 12th day of July, 1921.

JESSE T. LITTLETON, Jr.